United States Patent Office 2,804,482
Patented Aug. 27, 1957

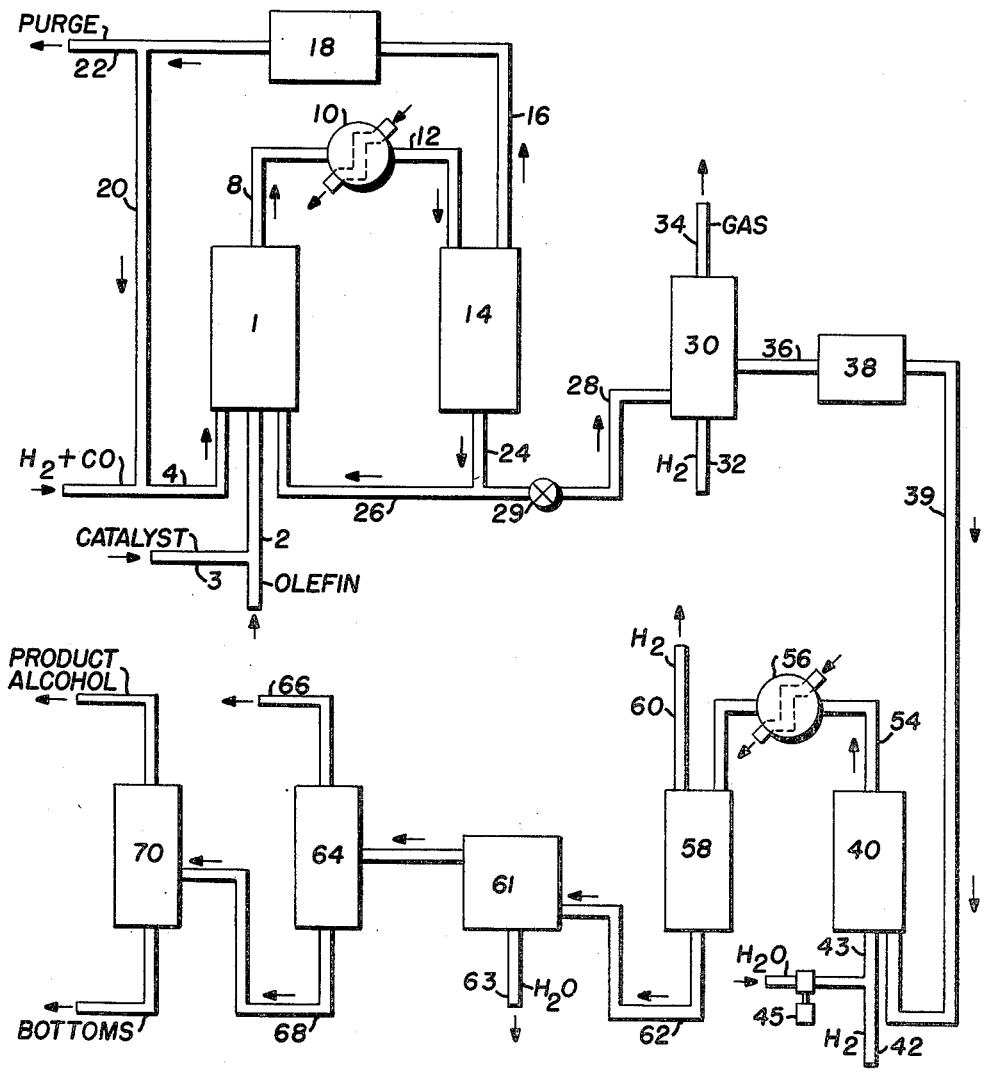

2,804,482

IMPROVED OXO HYDROGENATION PROCESS

Edward A. Hunter and Harold T. Baker, Baton Rouge, La., assignors to Esso Research and Engineering Company, a corporation of Delaware Application April 16, 1954, Serial No. 423,677

5 Claims. (Cl. 260—638)

The present invention relates to the preparation of oxygenated organic compounds by the reaction of olefinic carbon compounds with hydrogen and carbon monoxide in the presence of a carbonylation catalyst. More specifically, this invention relates to an improved process for increasing the selectivity of the process to useful alcohols and improving the strength of the catalyst employed in hydrogenating the aldehyde produced in the first stage of the reaction.

It is now well known in the art that oxygenated organic compounds may be synthesized from olenfinic organic compounds by reaction of the latter with carbon monoxide and hydrogen in the presence of a catalyst containing cobalt or other carbonylation catalyst in an essentially three-stage process. In the first stage the olefinic material, catalyst, and synthesis gases are reacted under pressure to give a product consisting predominantly of aldehydes containing one more carbon atom than the olefinic material, as well as a certain amount of secondary reaction products, polymeric material, etc. This oxygenated organic mixture, which contains in solution compounds of the metal catalyst, may be treated in a second stage with heat to cause decomposition and removal of the soluble catalytic material from the organic mixture. The catalyst-free material may then be hydrogenated in a hydrogenation stage to the corresponding alcohol, or it may be oxidized to the corresponding carboxylic acid.

This carbonylation reaction provides a particularly attractive method for the preparation of valuable primary alcohols which find large outlets, particularly as intermediates for plasticizers, detergents, and solvents. Not only long and short chained olefinic hydrocarbons, but also, most other types of organic compounds containing at least one olefinic double linkage, such as unsaturated acids, esters, alcohols, ketones, etc., are susceptible to this type of reaction.

The catalyst for the first stage of the reaction, where olefinic material is converted into aldehydes, is usually added in the form of salts of the catalytically active metal with high molecular weight organic acids, such as oleic, stearic, naphthenic, etc. Examples of such catalyst salts or soaps are cobalt oleate, stearate, naphthenate and the like. These salts are soluble in the liquid olefin or olefin-paraffin feed, and may be supplied to the first stage as dissolved in the feed or as hydrocarbon solution.

As the synthesis gases are consumed at equivalent or equimolar rates, synthesis gas components are usually added at equimolar proportions of $H_2$ and CO, though it has been suggested to use both an excess of hydrogen and an excess of CO. The conditions for reacting olefinic compounds with hydrogen and carbon monoxide vary somewhat in accordance with the nature of the olefinic feed, but the reaction is generally conducted at pressures of about 3000 pounds per square inch and at temperatures in the range of about 200°–450° F. The ratio of synthesis gas feed to olefin may vary widely; in general, about 1000 to 15,000 cubic feet of $H_2+CO$ per barrel of olefin feed are employed.

At the end of the first stage, when the desired conversion of olefins to oxygenated compounds has been effected, the products and the unreacted material are generally withdrawn to a catalyst removal zone, where dissolved catalyst is removed from the mixture by thermal treatment.

From the carbonylation catalyst removal zone the aldehyde product is passed to a hydrogenation zone for conversion to alcohols. The hydrogenation stage may be a fixed bed operated at conventional hydrogenation conditions which include temperatures, pressures and gas and liquid feed rates approximately within the ranges specified above for the first stage. It is to the catalytic treatment of the aldehyde product, in particular to the nature of the hydrogenation catalyst, that the present invention applies.

In the past it has been suggested to employ as Oxo hydrogenation catalyst, such catalysts as nickel, cobalt, copper chromite, oxides and sulfides of tungsten and molybdenum, etc., all of which may be, if desired, supported on a suitable carrier. All of these catalysts, however, have not been entirely satisfactory, due to the nature of the carbonylation reaction and to the products present in the stream to the hydrogenation plant.

An important problem involves in the aldehyde-alcohol synthesis process is the presence of water in amounts up to as much as 10% in the hydrogenation zone. Water results in part from the nature of the secondary reactions occurring in the first stage. Thus, aldehydes may in part be further reduced in the first stage to form alcohols which in turn react with further quantities of aldehydes, with water formed as a by-product. Similarly, cannizzaro type reactions followed by esterification produce water, as also intra and intermolecular dehydration.

However, not only is water formed in the first stage of the process, but it also has been found that hydrogenation itself is considerably improved when water in amounts up to 10% is added to the hydro stage. The selectivity to the desired alcohols is significantly increased, the water possibly functioning to repress acetal formation and alcohol dehydration.

With the presence of water in the hydrogenation stage it becomes necessary, therefore, to employ a catalyst that is not affected by water, either in activity or in physical strength. High mechanical strength is of particular importance in commercial operation which involves the use of fixed catalyst beds of considerable height and weight to which the lower catalyst layers are subjected. In addition, the hydrogenation stage is a liquid phase operation in which catalyst is subjected to the action of high velocity liquid streams which tend to disintegrate the catalyst, leading to channeling and plugging in the reactor when a structurally weak catalyst is employed. The need of a water-resistant catalyst of satisfactory activity, which may be used at conditions conducive to substantially complete conversion of aldehydes into alcohol, therefore, has been strongly felt in the synthesis art. The present invention fills this need.

A step forward in the art was taken by the proposal that sulfactive catalyst suitably supported, such as molybdenum sulfide on activated carbon, be employed. These types of catalyst have the necessary mechanical strength, but in general require higher reaction temperatures than metal catalyst, and too high temperatures decrease alcohol selectivity. Also, they have the disadvantage that when they are freshly sulfided or regenerated for an extended period of time, the resultant alcohols are contaminated with sulfur and require rerunning, and this tendency exists until the sulfided catalyst has come into equilibrium with the alcohol.

A further problem encountered with the use of sulfactive catalysts is that, in particular when relatively low molecular weight aldehydes are hydrogenated, excessive amounts of hydrocarbons are formed, due to the relatively high hydrogenation temperatures required. These hydrocarbons are very difficult to separate by distillation and fractionation, for some of the hydrocarbons boil in the range of the alcohol product. Thus, when a butylene fraction is passed as feed to the carbonylation stage to form a mixture of amyl aldehydes, and this material is hydrogenated over a sulfactive catalyst consisting of 10% molybdenum sulfide supported on activated char, an alcohol product contaminated with 5–10% hydrocarbons, most of which boil in the alcohol range, is obtained. On the other hand, when catalysts such as nickel or copper chromite are employed to hydrogenate such aldehyde product, substantially lower temperatures may be employed, little or no hydrocarbon is formed in the hydrogenation, but the catalysts have very poor physical strength, particularly in the presence of water, which is a desirable additive to aid alcohol selectivity. This is clearly shown in the data below:

HYDROGENATION OF $C_5$ OXO ALDEHYDES

[5-10 wt. percent added water. 3 liter shaker autoclave unit.]

| Catalyst | Com. Nickel | Copper Chromite | Molybdenum Sulfide on Char |
|---|---|---|---|
| Type Hydrogen | Electrolytic | Methanized Commercial | |
| Temperature, °F | 350 | 450 | 450 |
| Pressure, p. s. i. g. | 1,800 | 2,900 | 2,600 |
| Hours of Run | 6 | 6 | 6 |
| Product Carbonyl No | 0.7 | 5.1 | 125 |
| Wt. percent Hydrocarbons in Distilled Alcohol | <1 | <1 | 8.0 |
| Used Catalyst Crushing Strength, Lbs.: | | | |
| Maximum | 4 | (complete catalyst disintegration.) | 36.0 |
| Minimum | 2 | | 20.0 |
| Average | 3.2 | | 27.2 |

It is the principal purpose of the present invention, therefore, to provide an improved catalyst for the hydrogenation of aldehydes formed by the carbonylation reaction.

A more specific purpose and object of the present invention is to improve the operation of the liquid phase hydrogenation stage of the alcohol synthesis process, particularly when water is present.

It is a still further object of the present invention to prepare catalysts suitable for hydrogenating aldehydes, particularly, in the presence of water, which shall have high activity and good typical strength coupled with high selectivity to alcohols and low selectivity to hydrocarbons, particularly when employed in hydrogenating relatively low molecular weight aldehydes.

Other and further objects and advantages of the invention will appear hereinafter.

In accordance with the present invention, the aldehyde product from the first stage of the synthesis is hydrogenated in the liquid phase in the presence of a hydrogenation catalyst prepared by mixing a slurry of powdered glass, glass wool or other finely divided form of glass with a compound of nickel, such as nickel nitrate or oxide or carbonate, drying, and heating to sinter the glass. The nickel thus incorporated in the glass skeletal structure, forms a catalyst of high physical strength which will not disintegrate in the presence of water as unbonded catalysts, and catalysts pelleted by conventional means, such as mechanical pilling with punches and dies, or extrusion of pastes followed by drying, will.

In the hydrogenation of aldehydes, selectively to alcohols, nickel catalysts have shown great promise except that commercially available nickel catalyst pellets, such as nickel supported on kieselguhr, quickly disintegrate in service. This condition is aggravated by the presence of water, frequently added in the process. The use of the sintered glass binder in pelleting, which prevents pill disintegration in service, even in the presence of water, is a means of securing the benefits of the high selectivity of nickel and certain other hydrogenation catalyts, like cobalt chromite and copper chromite, without the attendant disadvantages.

The use of these glass-bonded pellets is particularly valuable in continuous operations. In batch processes, the disintegration of a catalyst does not remove the catalyst from the reaction zone, though it does introduce purification problems. In a continuous process, however, catalyst disintegration causes a marked decrease in overall conversion, for the disintegrated catalyst particles are removed from the reaction zone by the product streams. Thus, a catalyst in a form that disintegrates will result in a marked decrease in overall conversion for a given quantity of feed than the same catalyst in a non-disintegrating form, even though the activity characteristics are the same.

For example, a reduced nickel catalyst supported on kieselguhr disintegrated almost completely in the hydrogenation of an Oxo aldehyde product at 350° F. in the presence of 5% water. When the same catalyst was incorporated in and on the sintered glass support, there was no disintegration.

The employment of nickel, copper chromite and cobalt chromite hydrogenation catalysts is well-known in the art, even in the comparatively recent Oxo art. However, as has been pointed out, it has been found that the process of making the catalyst plays a vital role in the suitability of the catalyst for the continuous Oxo hydrogenation service, for the stronger the catalyst the longer may the operation be carried out and the higher the overall alcohol yield for a given catalyst charge.

In general, in the present invention, hydrogenation catalysts of the reduced metal or mixed oxide type, such as nickel and copper chromite, may be employed. A suitable method for introduction of the glass binder is to mix a nickel compound with glass wool or a slurry of powdered glass, in amounts sufficient to give a 20–80% by weight of nickel. Substantially any compound of nickel or powdered nickel itself may be used. Thereafter, the mixture is dried, pelleted, and heated to 1100 to 1500° F. to sinter the glass. This is followed by reduction with $H_2$ at 600–900° F., which activates the catalyst for hydrogenation. Also, powdered glass may be dry mixed with the reactive hydrogenation agent and heated to above the softening temperature of the glass in order to fuse the particles into a fritted glass-catalyst pellet.

The process of the invention in all its stages may be carried out by conventional means in any suitable equipment. The design and operation of such equipment will be briefly described hereinafter with reference to the accompanying drawing which illustrates schematically a suitable system of this type.

Referring now to the figure, an olefinic hydrocarbon having one carbon atom less than the number of carbon atoms in the desired resulting alcohol and containing dissolved a catalyst promoting the reaction of olefinic compounds with carbon monoxide and hydrogen to form oxygenated organic compounds is fed to the lower portion of primary reactor 1 through feed line 2. Any conventional type catalyst such as cobalt stearate, naphthenate, oleate, linoleate, etc., may be used. Catalyst make-up dissolved in olefin feed may be added to the main olefin feed line 2 through line 3. The concentrations of catalyst and the proportions of the catalyst-containing feed to the non-catalyst containing feed are such that the concentration of catalyst in the total olefin feed varies between 0.1 to 5.0% by weight, preferably about 1% by weight of catalyst salt to olefin.

Simultaneously a gas mixture containing hydrogen and carbon monoxide in the approximate ratio of 0.5 to 2.0 volumes of hydrogen per volume of carbon monoxide is supplied through line 4 and is fed to primary reactor 1.

Reactor 1 is preferably operated at about 3000 p. s .i. g. and at a temperature of from about 250–450° F. The reactor may contain no packing, or may be packed with catalytically inert solid material, as ceramic rings, pumice, and the like.

Reactor 1 is preferably operated at a temperature of from about 250°–450° F., depending upon the nature of the olefin feed and other reaction conditions. The rate of flow of synthesis gases and olefins through reactor 1 is so regulated that the desired conversion level of the olefinic material is obtained.

A mixture of liquid oxygenated reaction products containing in solution unreacted olefins, dissolved catalyst, unreacted synthesis gases, and secondary reaction products is withdrawn overhead from reactor 1 and is transferred through line 8, and cooler 10, and line 12, to high pressure separator 14, where unreacted gases are withdrawn overhead through line 16, scrubbed in scrubber 18 of entrained liquid, and used in any way desired. They may be recycled to synthesis gas feed line 4 via line 20 for use in adjusting the desired $H_2$ partial pressure and for adjusting the $H_2/CO$ ratio in the feed to reactor 1. If desired, only a part of the gases from separator 14 may be thus employed. The balance may be purged from the system through line 22.

A stream of liquid mixture comprising primary reaction product, unconverted olefins and secondary reaction products, and containing relatively high concentrations of cobalt carbonyl as well as other cobalt compounds and complexes, and which may contain up to 3% or more water, resulting at least in part from secondary reactions as described heretofore, is withdrawn from separator 14 through line 24. A portion of said withdrawn stream may be recycled, if desired, to reactor 1 via line 26 to aid in cooling and maintenance of temperature control of the primary carbonylation stage. The balance of the primary reaction product may be withdrawn through line 28, pressure release valve 29, and thence to decobalting zone 30 wherein by suitable heat treatment at about 200°–400° F., the dissolved cobalt carbonyl is decomposed to metallic cobalt and cobalt compounds. A stream of hydrogen comprising gas may be admitted through line 32 to aid in stripping and removing CO resulting from the decomposition of the metal carbonyl. Zone 30 may be operated at high pressure, though pressures of 15–200 p. s. i. g. may also be employed. The gas stream comprising CO and $H_2$ may be removed from zone 30 through line 34. This gas stream may advantageously be employed in the subsequent hydrogenation step. Other methods of cobalt removal, as by thermal treatment with water, steam, or dilute organic acids, may also be employed.

The liquid product from the decobalter 30 is withdrawn through line 36 and may be passed to filter 38 for removal of suspended solids, thence through line 39 to the lower portion of fixed bed hydrogenator 40. Simultaneously, hydrogen is supplied to reactor 40 through line 42 in proportions sufficient to convert the aldehyde product to alcohols. Reactor 40 contains a fixed bed of hydrogenation catalyst prepared in the manner as described above. Suitable operating conditions include pressures of 2000–4000 p. s. i. g., and temperatures of from 300–500° F., depending upon the nature of the aldehyde product being treated. Feed rates (liquid) of about 0.25–1.5 v./v./hr. and $H_2$ feed rate of 5000–10,000 standard cubic feet/barrel of liquid may be employed.

Preferably, water is injected into hydrogenator 40 through line 43 and pump 45. The amount of water added may be as much as 10 vol. percent of the liquid feed to hydrogenator 40. Water addition may be continuous or intermittent. The rate of addition is determined to some extent by the rate of decobalter feed addition, and the water may, if desired, be preheated prior to injection. The catalyst of the present invention, because of its ruggedness, permits this beneficial injection of water. Other catalysts, as shown subsequently, are rapidly deactivated and disintegrated by the presence of water. Water may increase the alcohol selectivity 10% or even higher. However, it may not under certain circumstances, be necessary or desirable to add water.

The products of the hydrogenation reaction may be withdrawn overhead through line 54, then through cooler 56 into high pressure separator 58, where unreacted hydrogen may be withdrawn overhead through line 60 for further use in the system, if desired. Liquid products are withdrawn from liquid-gas separator 58 through line 62 and passed to settler 61, where water may be withdrawn through line 63, and the upper alcohol containing layer passed to hydrocarbon still 64, where low-boiling products, mostly hydrocarbons boiling below the alcohol product desired are distilled overhead. Thus, when $C_7$ olefin fraction is the feed to carbonylation reactor, generally the product boiling up to 340° F. is removed as a heads cut in hydrocarbon still 64. This material may be withdrawn overhead through line 66 and may be used as a gasoline blending agent. The bottoms from this primary distillate are withdrawn from still 64 and sent through line 68 to alcohol still 70 where product alcohols boiling in the desired range may be removed overhead by distillation at atmospheric or reduced pressures, depending upon their molecular weight. The bottoms from this distillation may be further processed or, if desired, may be used as fuel.

The invention may be further illustrated by the following specific examples which point out clearly the advantages realized when operating with the catalyst of the present invention.

*Example I*

The catalyst compositions of the present invention were prepared as follows:

CATALYST "B"

*Materials.—*

1230 grams of nickelous nitrate $Ni(NO_3)_2.6H_2O$, Bakers C. P. grade 570 grams of ammonium carbonate $(NH_4)_2CO_3.H_2O$, Bakers C. P. grade 165 grams of powdered soft glass

*Procedure.—*The powdered glass was mixed in a slurry of the 1230 grams of nickel nitrate in 1000 cc. of water. With stirring, the ammonium carbonate solution was slowly added (570 grams of carbonate in 2300 cc. of water) and the precipitated slurry was aged overnight at 170° F. with stirring. The precipitate was then filtered and washed with about 4 liters of distilled water. The precipitate was then dried overnight at 200–250° F. The powder was pilled into 3/16" pellets and heated 2 hours at 1300° F. to form hard pellets. The pilling presses the glass into more intimate contact and a better fusion is obtained upon heating. An experiment in which a slurry of the glass and nickel oxide was spread out on a sheet of metal and then heated resulted in a catalyst that did not have any strength. In order to obtain a good glass frit, it is necessary to compress the powder of glass and nickel oxide before heating.

Excellent results could be obtained by using a very finely powdered glass or other finely divided material such as kieselguhr or other clay base for the nickel carbonate precipitation and adding the glass after the precipitate has been dried. Since the activity of the nickel is a function of the state of subdivision of the nickel, the greater the number of centers for the precipitation of the nickel carbonate the better the resultant catalyst.

Catalyst "A," a commercially available supported nickel catalyst, is prepared by precipitating nickel carbonate from a slurry of kieselguhr and nickel salt solution.

Catalyst "C" was prepared by dry-mixing 250 grams of catalyst "A" and 100 grams of powdered soft glass, pilling to 3/16 inch pills and heating the resulting pills or pellets at 1300° F. for 2 hours.

*Example II*

The catalyst compositions of the invention were thereafter tested for activity and strength in the autoclave hydrogenation of iso-octyl aldehyde in the presence of water. For comparison, a commercial nickel-kieselguhr catalyst (catalyst "A") was employed, with the following results:

| Catalyst | "A" | "B" | "C" |
|---|---|---|---|
| Composition | Nickel-Kieselguhr | Nickel-Glass: 40% glass, 60% nickel (red.) | Nickel-Glass: 40% glass, 60% catalyst "A" |
| Wt. Percent Cat | 20 | 20 | 20 |
| Wt. Percent H₂O | 5 | 10 | 10 |
| Temperature, °F | 350 | 450 | 350–375 |
| Hours | 6 | 6 | 6 |
| Product Carbonyl No | 3.3 | 4.8 | 9.6 |
| Product Distribution: | | | |
| Wt. Percent Alcohol | 72.2 | 70.5 | 70.9 |
| Wt. Percent Bottoms | 19.9 | 23.6 | 23.1 |
| Catalyst Strength, lbs.: | | | |
| Before Use— | | | |
| High | | | |
| Low | | | |
| Average | 5–8 | | |
| After Use— | | | |
| High | | 18 | 20 |
| Low | Disintegrated | 14 | 10 |
| Average | | 15.2 | 16 |

*Example III*

To show further the extraordinary strength and ruggedness of catalyst compositions prepared in accordance with the present invention, a series of catalysts were prepared and refluxed with iso-octyl alcohol and 1% water for 12 hours. The catalysts, prepared in a manner similar to catalyst "B," had the following compositions:

Catalyst "D"—40% (wt.) soft glass and 60% Ni (as NiO)
Catalyst "E"—40% (wt.) soft glass and 60% Ni powder
Catalyst "F"—60% (wt.) soft glass and 40% Ni-W mixture

| | | Before Reflux | After Reflux | |
|---|---|---|---|---|
| | | | 6 hrs. | 12 hrs. |
| Catalyst "A": Lbs. side crushing strength. | Average | 42.4 | 11.8 | 9.2 |
| | High | 56 | 12 | 12 |
| | Low | 32 | 8 | 8 |
| Catalyst "D": Side strength, lbs. | Average | greater than 84. | | 113 |
| | High | | | 130 |
| | Low | | | 90 |
| Catalyst "E": Side strength, lbs. | Average | greater than 86. | | 172 |
| | High | | | 180 |
| | Low | | | 160 |
| Catalyst "F": Side strength, lbs. | Average | 71 | | 91 |
| | High | 81 | | 114 |
| | Low | 61 | | 65 |

These data clearly show that, while the catalyst composition of the present invention had hydrogenation activity of the same order of magnitude as the best and most active presently commercially available hydrogenation catalyst, the catalysts of the present invention have a considerably higher strength which, translated in terms of continuous operation, means substantially longer life and over-all activity, particularly in the presence of water.

The process and catalysts of the invention admit of many modifications and variations obvious to those skilled in the art. Thus, it may be desirable to improve the dispersion of the nickel catalyst on the glass support. A sintered composite of finely divided glass and nickel oxide may be improved in activity by wetting with an aqueous ammonia solution to improve the dispersion of the oxide on the glass. Thereafter the catalyst may be given a hydrogenation treatment to activate it.

What is claimed is:

1. In the process for the production of alcohols by reacting olefins with CO and $H_2$ in a carbonylation zone at elevated pressures and temperatures in the presence of a cobalt catalyst whereby aldehydes having one more carbon atom than said olefin are produced and wherein the aldehyde product is subsequently hydrogenated in the presence of a hydrogenation catalyst at liquid phase hydrogenation conditions in the presence of a hydrogenation catalyst at elevated temperatures and pressures in a hydrogenation zone to produce alcohols, the improvement which comprises carrying out said hydrogenation in the presence of a catalyst prepared by admixing a catalyst component selected from the group consisting of nickel and nickel compounds with finely divided glass compressing the resultant mixture into pellets and heating the resultant pellets to a temperature of 1100°–1500° F. to sinter the glass.

2. The process of claim 1 wherein said catalyst comprises 20–80% of active hydrogenating component.

3. The process of claim 1 wherein water is injected into said hydrogenation zone from an external source.

4. The process of claim 1 wherein said hydrogenation conditions include temperatures of from about 300° to about 500° F. and pressures of from about 2000 to 4000 p. s. i. g.

5. The process of claim 1 wherein said catalyst component is nickel.

References Cited in the file of this patent

UNITED STATES PATENTS

| 1,179,484 | Wells | Apr. 18, 1916 |
| 1,970,695 | Freyermuth | Aug. 21, 1934 |
| 2,299,768 | Shabaker | Oct. 27, 1942 |
| 2,430,432 | Marisic | Nov. 4, 1947 |
| 2,636,903 | Mertzweiller | Apr. 28, 1953 |
| 2,671,119 | Mertzweiller | Mar. 2, 1954 |
| 2,671,814 | Mertzweiller | Mar. 9, 1954 |
| 2,712,984 | Guebert | July 12, 1955 |

OTHER REFERENCES

Hackh's Chemical Dictionary, Blakiston, Phila., 1950; pp. 377, 378.

Van Voorthuijsen et al.: Rec. Trav. Chim., vol. 70, pp. 793–812.